United States Patent
Boudreault et al.

(10) Patent No.: US 8,821,013 B2
(45) Date of Patent: Sep. 2, 2014

(54) THERMOCOUPLES WITH TWO TABS SPACED APART ALONG A TRANSVERSE AXIS AND METHODS

(75) Inventors: Daniel R Boudreault, Lexington, KY (US); Kenneth P Ehrlich, Lexington, KY (US); David D Rye, Louisville, KY (US)

(73) Assignee: Corning Incorporated, Corning, NY (US)

( * ) Notice: Subject to any disclaimer, the term of this patent is extended or adjusted under 35 U.S.C. 154(b) by 374 days.

(21) Appl. No.: 13/106,237

(22) Filed: May 12, 2011

(65) Prior Publication Data

US 2012/0106594 A1    May 3, 2012

Related U.S. Application Data

(60) Provisional application No. 61/407,669, filed on Oct. 28, 2010.

(51) Int. Cl.
*G01K 7/00* (2006.01)
*G01K 7/04* (2006.01)

(52) U.S. Cl.
CPC ........................................ *G01K 7/04* (2013.01)
USPC ........................... 374/179; 374/208; 136/230

(58) Field of Classification Search
USPC .................................. 374/179, 208; 136/230
See application file for complete search history.

(56) References Cited

U.S. PATENT DOCUMENTS

| | | | |
|---|---|---|---|
| 2002/0088640 A1 | 7/2002 | Schuh et al. | 174/117 |
| 2004/0220775 A1 | 11/2004 | Schuh | 702/185 |
| 2006/0227849 A1 | 10/2006 | Phillips | 374/179 |
| 2008/0175304 A1 | 7/2008 | Adelsberg et al. | 374/179 |
| 2012/0106594 A1 | 5/2012 | Boudreault et al. | 374/179 |

*Primary Examiner* — Mirellys Jagan
(74) *Attorney, Agent, or Firm* — Kevin M. Able; Stephen S. Wentsler; Matthew J. Mason

(57) ABSTRACT

Methods for determining a temperature of a portion of an electrically conductive substrate are provided wherein the substrate is heated by applying an electrical current flow through the substrate. The method for determining the temperature employs a thermocouple including a first tab element and a second tab element that are spaced apart from one another along an axis transverse to a direction of the current flow. In another example, an apparatus includes an electrically conductive substrate and a direct heating apparatus configured to heat the substrate with an electrical current flow through the substrate. The apparatus includes first and second coupling positions of a thermocouple that are spaced apart from one another along an axis transverse to a direction of the current flow.

21 Claims, 5 Drawing Sheets

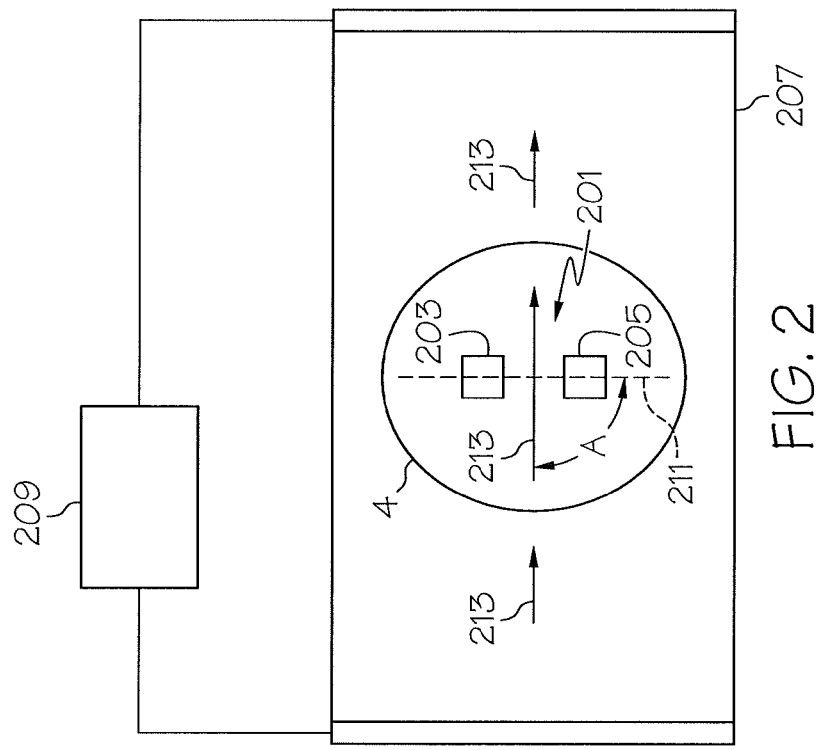
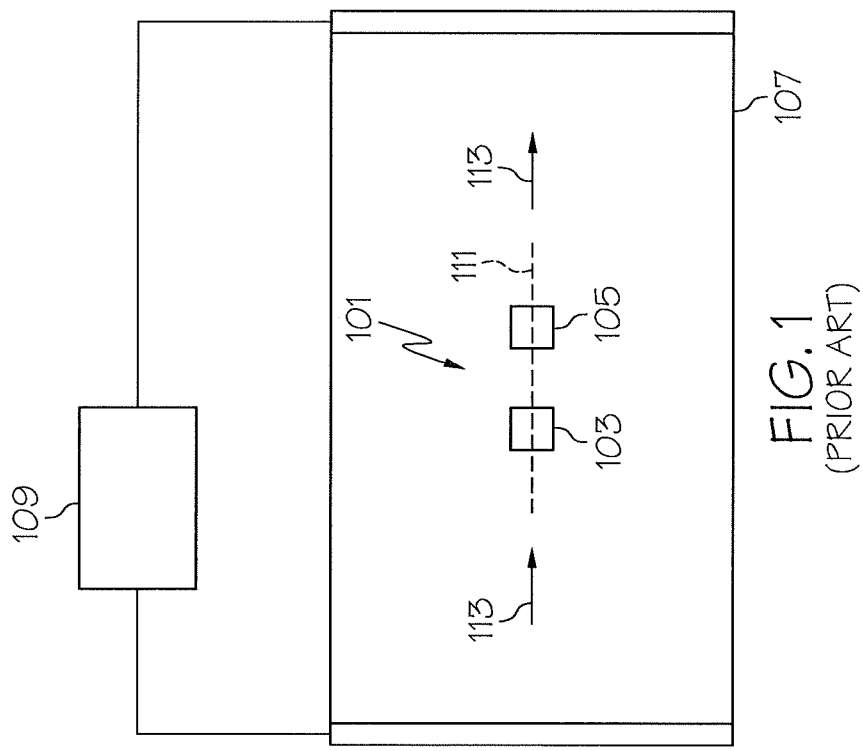

THERMOCOUPLES WITH TWO TABS SPACED APART ALONG A TRANSVERSE AXIS AND METHODS

CROSS-REFERENCE TO RELATED APPLICATION

This application claims the benefit of priority under 35 U.S.C. §119 of U.S. Provisional Application Ser. No. 61/407,669 filed on Oct. 28, 2010 the content of which is relied upon and incorporated herein by reference in its entirety.

TECHNICAL FIELD

The field relates generally to thermocouples, and, more particularly, to apparatus and methods for determining a temperature of a portion of an electrically conductive substrate.

BACKGROUND

Measuring the temperature of a direct heated apparatus with a thermocouple is desirable for various applications. U.S. Patent Application Publication No. 2008/0175304 to Adelsberg et al. (hereinafter the "Adelsberg publication") discloses a thermocouple circuit that exhibits reduced levels of thermocouple drift. The Adelsberg publication discloses the thermocouple including first and second tab elements that are spaced apart from another.

FIG. 1 illustrates a schematic view of a conventional arrangement of a thermocouple 101 including first and second tab elements 103, 105 attached to an electrically conductive substrate 107. The electrically conductive substrate 107 is operably connected to a direct heating apparatus 109 configured to heat the substrate with an electrical current flowing through the substrate. As shown, the tab elements 103, 105 are spaced apart from one another along a horizontal axis 111 that is parallel to a direction 113 of the electrical current flowing through the substrate.

As described in the Adelsberg publication, the spaced apart tabs are useful to reduce levels of thermocouple drift. However, spacing the tab elements as shown in FIG. 1 may exhibit excess EMF noise due, at least in part, to the flow of an electric current in the direction 113 along the axis 111 of the spaced apart tabs 103, 105. The thermocouple typically generates EMF signal that varies with temperature. The EMF signal may cause excess signal noise that interferes with the operation of the thermocouple. For example, at 1650° C., a conventional type B thermocouple may generate an 11.848 mVDC EMF. At the same temperature, a conventional type S thermocouple may generate a 17.366 mVDC EMF. By spacing tab elements of a thermocouple in the orientation shown in FIG. 1, additional excess EMF signal noise (e.g., an additional 64.8 mVDC) may be generated on top of the EMF signal noise that the type B and type S thermocouples normally produce. This excess signal noise may produce a 4° to 5° C. signal noise. The 4° to 5° C. signal noise may lead to inaccurate temperature readings of the substrate, thereby complicating the use of the thermocouple in a monitoring or control capacity.

SUMMARY

The following presents a simplified summary of the disclosure in order to provide a basic understanding of some example aspects described in the detailed description.

In one example aspect, a method for determining a temperature of a portion of an electrically conductive substrate comprises providing a thermocouple comprising a first thermoelectric element formed of a first thermoelectric material and having a first proximal end and a first distal end. The method further provides a second thermoelectric element formed of a second thermoelectric material and having a second proximal end and a second distal end. The method further comprises the step of forming a thermocouple circuit by coupling the respective proximal ends of the first and second thermoelectric elements to a portion of the electrically conductive substrate through intermediate first and second tab elements, respectively. The first and second tab elements have a composition substantially the same as the first and second thermoelectric materials, respectively. The first and second tab elements are spaced apart such that the first and second proximal ends are not physically coupled each to the other. The method further comprises the step of heating the electrically conductive substrate by applying an electrical current flow through the electrically conductive substrate, wherein the first tab element and the second tab element are spaced apart from one another along an axis transverse to a direction of the current flow. The method further comprises the step of quantifying a voltage provided by the formed thermocouple circuit, wherein said voltage is indicative of a temperature within the portion of the electrically conductive substrate.

In another example aspect, an apparatus comprises an electrically conductive substrate, and a direct heating apparatus configured to heat the substrate with an electrical current flow through the substrate. The apparatus further includes a first thermoelectric element formed of a first thermoelectric material and having a first proximal end and a first distal end. The first proximal end is coupled to the electrically conductive substrate through an intermediate first tab element formed of the first thermoelectric material at a first coupling position. The apparatus further includes a second thermoelectric element formed of a second thermoelectric material and having a second proximal end and a second distal end. The second proximal end is coupled to the electrically conductive substrate through an intermediate second tab element formed of the second thermoelectric material at a second coupling position. The first and second coupling positions are not physically coupled together and are spaced apart from one another along an axis transverse to a direction of the current flow. The apparatus further includes a voltage measuring device electrically coupled to the first and second distal ends.

BRIEF DESCRIPTION OF THE DRAWINGS

These and other aspects are better understood when the following detailed description is read with reference to the accompanying drawings, in which:

FIG. 1 is a schematic view of a conventional arrangement of a thermocouple;

FIG. 2 is a schematic view of an arrangement of a example thermocouple according to various aspects of the disclosure;

DETAILED DESCRIPTION

Figure 4:
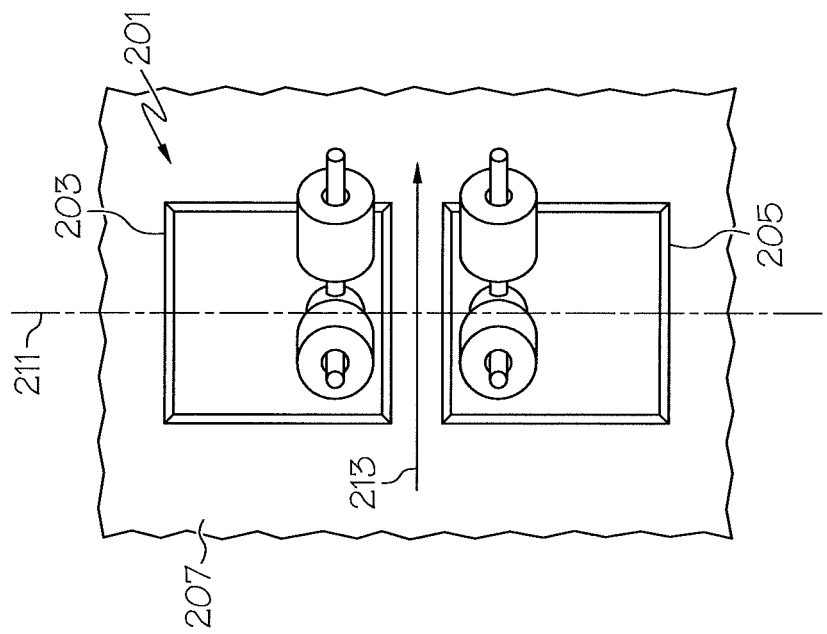
FIG. 4 is an enlarged top view of the example thermocouple illustrated in FIGS. 2 and 3.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Various aspects of the disclosure may be used with apparatus including thermocouples and substrates mentioned in U.S. Patent Application Publication No. 2008/0175304 to Adelsberg et al., that is herein incorporated by reference in its entirety. FIG. 2 illustrates a schematic arrangement of a thermocouple 201 according to various aspects of the disclosure. Thermocouple 201 includes first and second tab elements 203, 205 attached to an electrically conductive substrate 207. The electrically conductive substrate 207 can be operably connected to a direct heating apparatus 209 configured to heat the substrate with an electrical current flowing through the electrically conductive substrate 207. As shown, the first and second tab elements 203, 205 are spaced apart from one another along an axis 211 transverse to a direction 213 of the electrical current flow. The transverse axis 211 may extend at a wide range of angles relative to the direction 213 of the current flow. For example, the transverse axis 211 may be oriented at an angle relative to the direction 213 such that the transverse axis 211 is not parallel and not coincident with the direction 213 of the current flow. For example, as shown, the transverse axis 211 is substantially perpendicular to the direction 213 of the current flow such that an angle "A" is about 90°. In other examples, an angle "A" between the transverse axis 211 and the direction 213 may be from about 45° to about 90°, such as from about 60° to about 90°, from about 70° to about 90°, from about 80° to about 90°, from about 85° to about 90°, or other angles.

Referring still to FIG. 2, the orientation of the thermocouple 201 with the first and second tab elements 203, 205 spaced apart from one another along the transverse axis 211 may reduce or eliminate the excess EMF noise that may be generated on top of the EMF signal noise that the type B and type S thermocouples normally produce. More specifically, the additional EMF noise that may otherwise be generated when spacing the first and second tabs as shown in FIG. 1 may be reduced, such as eliminated, by orienting the thermocouple transverse to the direction of the current flow (e.g., as shown in FIG. 2). The reduced, such as eliminated, excess EMF noise may further allow for a lower drift thermocouple to be used. Reducing, such as eliminating, excess EMF noise can preserve the benefit that a lower drift thermocouple provides with respect to accurate temperature readings. With the excess noise reduced, the 4° to 5° C. variation due to signal noise may be correspondingly reduced, thus allowing for a lower drift thermocouple to be used. A lower drift thermocouple can provide for more accurate detection and reporting of temperatures.

Figure 3:
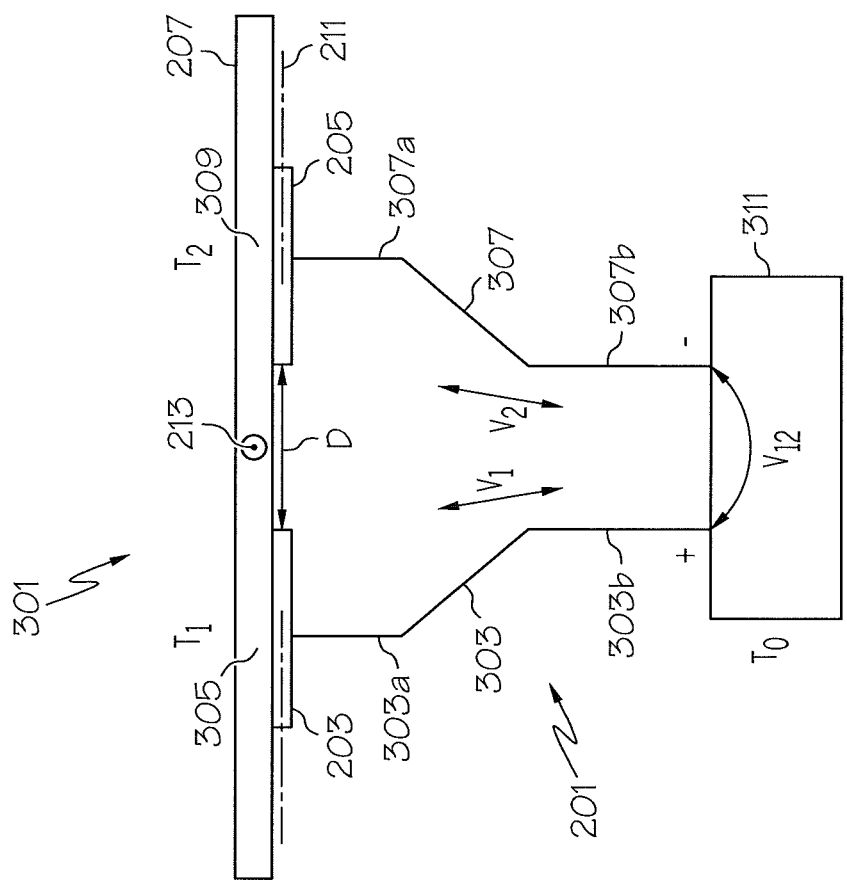
FIG. 3 is a schematic view of an example thermocouple circuit with the thermocouple illustrated in FIG. 2.

Referring now to FIG. 3, an example apparatus 301 is provided for forming a thermocouple circuit. The apparatus 301 includes the example thermocouple 201 configured to be coupled to the electrically conductive substrate 207. The thermocouple 201 generally includes a first thermoelectric element 303 formed of a first thermoelectric material and having a first proximal end 303a and a first distal end 303b. The first proximal end 303a is configured to be coupled to the electrically conductive substrate 207 at a first coupling point 305. The thermocouple 201 further includes a second thermoelectric element 307 formed of a second thermoelectric material and having a second proximal end 307a and a second distal end 307b. The second proximal end 307a is configured to be coupled to the electrically conductive substrate 207 at a second coupling point 309 spaced a distance "D" apart from the first coupling point 305 such that the second proximal end 307a is not physically coupled to the first proximal end 303a. The coupling of the first and second proximal ends 305a, 307a with the electrically conductive substrate 207, which is electrically conductive, is referred to herein as the 'hot junction.'

As shown, the second distal end 307b and the first distal end 303b can be coupled to a measurement device 311 positioned at a distance from the electrically conductive substrate 207. The measurement device 311 can be, for example, a device for measuring a voltage between the first and second distal ends, and may include a data processing component. For example, the measurement device 311 may include a computer, a controller, a processor, a voltmeter, an input/output card (I/O card), etc. A voltage may develop across the first and second distal ends 303b, 307b, which is primarily the result of a temperature gradient along the length of the wires. The voltage may be read with the measurement device, and the voltage may be correlated to a temperature of the substrate.

As further shown in FIG. 3, in one example, the portion of thermocouple 201 extending between the proximal and distal ends of the thermoelectric elements can be provided as a thermoelectric lead or extension wires. Further, the first thermoelectric element 303 and second thermoelectric element 307 are each formed of different thermoelectric materials which, in combination, are suitable for forming a thermocouple circuit that can exhibit the Seebeck thermoelectric effect. To this end, in one aspect, the first and second thermoelectric elements may be formed of virtually any dissimilar metals, including noble metals and/or noble metal alloys.

Thermoelectric materials for forming the respective first and second thermoelectric elements can include platinum, rhodium, nickel, chromium, copper, nickel, iron, aluminum, silicon, magnesium, and alloys thereof. Combinations of the aforementioned thermoelectric materials can include 70% platinum-30% rhodium alloy and 94% platinum-6% rhodium (known as a type B thermocouple); nickel-chromium alloy and a copper nickel alloy (known as a type E thermocouple); iron and a copper nickel alloy (known as a type J thermocouple); nickel-chromium alloy and nickel-aluminum alloy (known as a type K thermocouple); nickel-chromium-silicon alloy and nickel-silicon-magnesium alloy (known as a type N thermocouple); 13% platinum-rhodium and platinum-platinum (known as a type R thermocouple); 10% rhodium and platinum (known as a type S thermocouple); and copper and a copper-nickel alloy (known as a type T thermocouple).

As further shown in FIG. 3, the first proximal end 303a and second proximal end 307a can each be coupled to the electrically conductive substrate 207 by the respective spaced apart first and second tab elements 203, 205. The first tab element 203 and second tab element 205 may each be positioned intermediate to the respective first and second proximal ends 303a, 307a and the electrically conductive substrate 207. In one example, the respective first and second tab elements 203, 205 may be formed from the same thermoelectric materials as the respective first and second thermoelectric elements 303, 307. For example, where the formed thermocouple circuit is a type B thermocouple, the first thermoelectric element 303 may be comprised of a 70% platinum-30% rhodium alloy and the second thermoelectric element 307 may be formed of a 94% platinum-6% rhodium alloy. According to this example, the first tab element 203 may also be formed of a 70% platinum-30% rhodium alloy and the second tab element 205 may be formed from the 94% platinum-6% rhodium alloy.

FIG. 4 is an enlarged top view of the example thermocouple 201 illustrated in FIGS. 2 and 3. In one example, the thermocouple 201 may include one or more insulators 401 configured to partially or completely surround each of the first and second thermoelectric elements 303, 307. The insulators 401 may include various materials based on the temperature to be measured. Moreover, the first thermoelectric element 303 may be provided with a first backup thermoelectric element 403 that may be formed from substantially similar or identical materials. Likewise, the second thermoelectric element 307 may be provided with a second backup thermoelectric element 407 formed from substantially similar or identical materials. The backup thermoelectric elements can provide an alternative circuit connection in the event that the primary element fails.

It has been found that in addition to other advantages, spaced apart coupling points may reduce or eliminate the condensation of volatized metallic species from one thermoelectric element of a first composition onto a second thermoelectric element of a second composition. Such volatilization can occur if the thermoelectric elements are exposed to very high temperatures, such as temperatures in excess of 1500° C. as might be found in a glass making process. The volatilized species, such as rhodium for example, can condense on cooler portions of the thermoelectric element(s), and be diffused into the thermoelectric element, thereby changing the electrical behavior of the thermoelectric element and thus the detected voltages in the thermocouple circuit (i.e. be observed as a thermocouple temperature drift). Thus, in one example, the rhodium concentration between co joined elements, such as the wire and the substrate, may begin to equilibrate, such that the drift may result in a temperature change.

The first and second tab elements 203, 205 may mitigate the effects of diffusion and drift between the first and second thermoelectric elements 303, 307 and the electrically conductive substrate 207 by providing a much larger mass immediately adjacent to the electrically conductive substrate 207 and interposed between the electrically conductive substrate 207 and the first and second thermoelectric elements 303, 307 so that changes in composition of these various elements resulting from diffusion is reduced. First and second tab elements 203, 205 can have any desired shape and thickness suitable for electrically coupling the first and second proximal ends 303a, 307a of the first and second thermoelectric elements 303, 307 to the substrate surface. However, the mass of each of the first and second tab elements 203, 205 may be substantially greater than the mass of each respective thermoelectric element adjacent the electrically conductive substrate 207.

Each tab element can have a variety of shapes, including a rectangular shape (as shown), circular shape, an elliptical shape, etc. In one example, the first and second tab elements 203, 205 may be substantially rectangular in shape having a surface area coupled to the electrically conductive substrate 207 that is in the range of approximately 0.1 to 0.5 inches. For example, the first and second tab elements 203, 205 can have a coupling surface area of approximately 0.25 inches. The first and second tab elements 203, 205 can also have a substantially uniform thickness that, in one example, can be in the range of from about 10 mils to about 50 mils. In another example, the tab element can have a substantially uniform thickness of about 30 mils. In practical terms, each of the first and second tab elements 203, 205 may have nominal length-width measurements (assuming a rectangular shape) or a diameter (assuming a circular shape) that is substantially larger than equivalent dimensions of the respective thermoelectric element.

Figure 5:
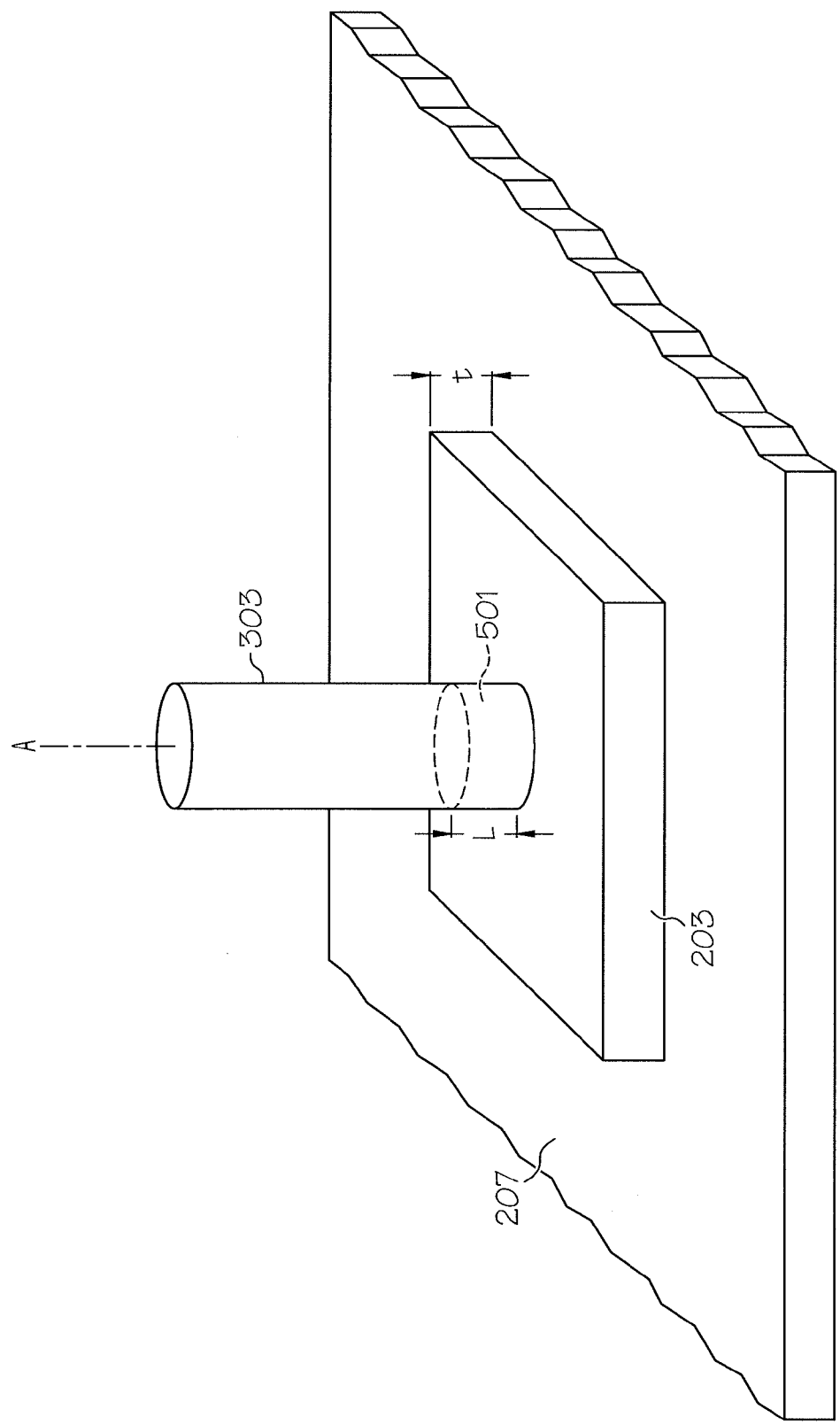
FIG. 5 is a perspective view illustrating a portion of the example thermocouple circuit according to FIG. 3.

Referring now to FIG. 5, an example of the first thermoelectric element 303 is shown attached to the first tab element 203 which is attached to the electrically conductive substrate 207. The first thermoelectric element 303 may be a wire having a longitudinal axis A of the wire, and a first tab element 203 may be intermediate between the wire and the electrically conductive substrate 207. A volume of a portion of the wire adjacent to the tab element 203 may have a length equal to the thickness of the tab element and may have a volume substantially less than the volume of the tab element. The volume of the tab element 203 may therefore be substantially larger than the volume of the respective portion of the wire adjacent to and coupled to the tab element 203. The wire may be viewed as a right circular cylinder attached to a tab element having a given thickness.

The tab element may have a certain volume $V_t$ based on the dimensions of the tab element, including the thickness of the tab element. A volume $V_w$ of a portion of the wire (i.e. right circular cylinder) having a length L equal to the thickness t of the tab element may be substantially less than the volume of the tab element, or conversely, the tab element may have a substantially greater volume than the volume of the portion of the wire having a length L adjacent the tab element. As shown in FIG. 5, the volume of tab element 203 may be substantially greater than the volume of wire portion 501. Substantially larger may mean that the volume of the tab element is at least about twice the volume of the adjacent portion of wire, and, may be at least about 4 times the volume of the adjacent portion of wire, and may even be at least about 8 times the volume of the adjacent portion of the wire. Of course, in typical circumstances the wire may be nominally cylindrical and therefore may have a circular cross section perpendicular to the longitudinal axis A. However, the thermoelectric element (e.g. wire) does not need to be circular to possess a portion having a volume as described above.

Figure 6:
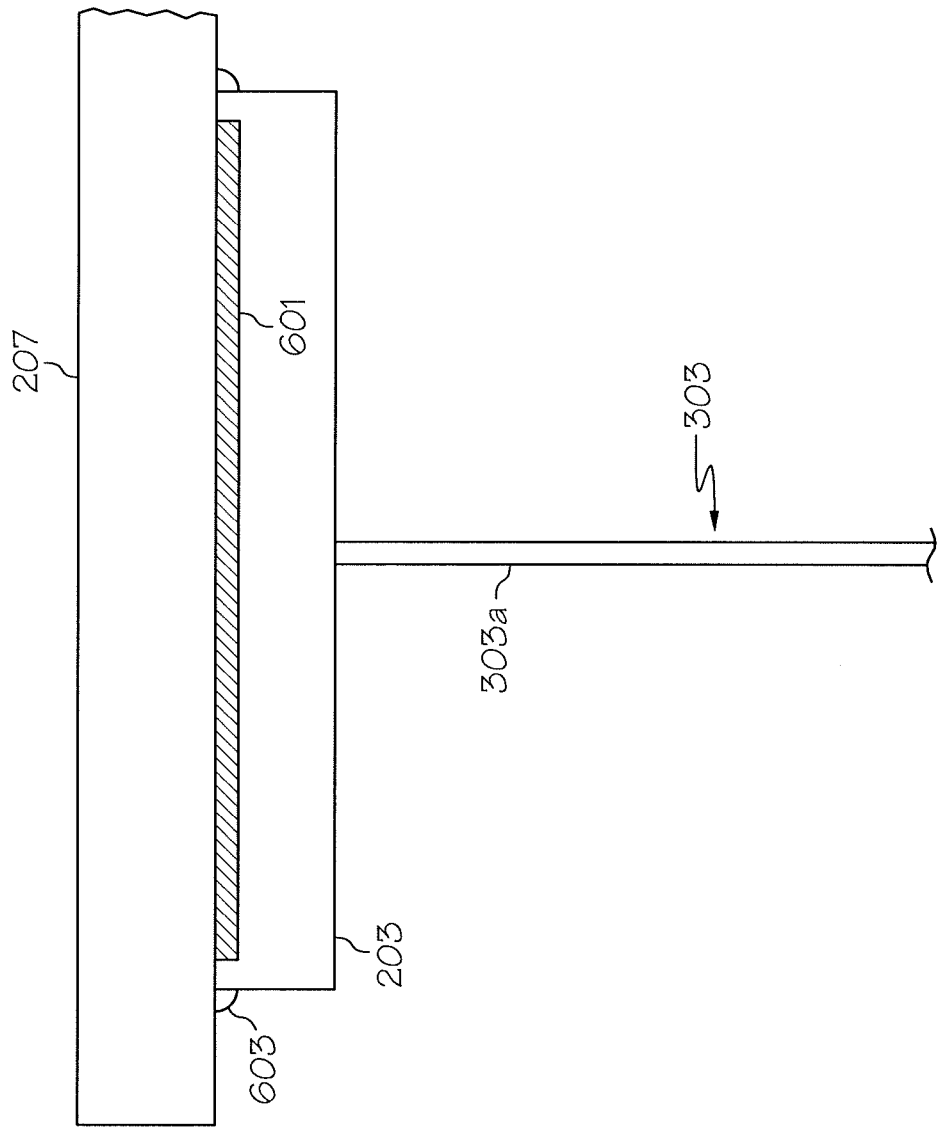
FIG. 6 schematically illustrates a portion of an example thermocouple circuit and depicts an embodiment of a tab element having a minimal contact area with the substrate.

Referring now to FIG. 6, the tab element(s) may be connected to the electrically conductive substrate 207 in a manner that minimizes the contact area between the electrically conductive substrate 207 and the material of the first tab element 203. According to this aspect, minimizing the contact area between a tab element 203, 205 and the electrically conductive substrate 207 can effectively reduce the diffusion of chemical species between two thermoelectric materials (e.g. the diffusion of rhodium) and can thus further reduce thermocouple drift. To this end, an insulating member 601 that nevertheless has a high thermal conductivity may be placed between a tab element and an electrically conductive substrate. In the shown example, the insulating member 601 is placed between the first tab element 203 and the electrically conductive substrate 207. Coupling between the tab element and the electrically conductive substrate 207 may thereafter be made by welding the tab element 203, 205 to the electrically conductive substrate 207 about a periphery of the tab element 203, 205 only as indicated by a welding bead 603. Of course, other methods of coupling the tab element 203, 205 to the electrically conductive substrate 207 may be employed. For example, the tab element 203, 205 may be coupled to the electrically conductive substrate 207 at only discrete, spaced apart locations in each of the first and second tab elements 203, 205, such as by welding only corners of the tab element 203, 205 to the electrically conductive substrate 207.

While FIG. 6 shows the first thermoelectric element 303 and first proximal end 303a attached to the first tab element 203, it is to be understood that the insulating member 601 can be placed either between the first tab element 203 and the electrically conductive substrate 207, between the second tab element 205 and the electrically conductive substrate 207 or in both locations. Therefore, two insulating members 601 can be provided, one between the first tab element 203 and the electrically conductive substrate 207, and the other between the second tab element 205 and the electrically conductive substrate 207. Accordingly, two welding beads 603 may also be provided, one at each of the insulating members.

A thermocouple circuit formed according to the present example can exhibit a reduction in thermocouple drift when compared to the typical thermoelectric drift observed by conventional thermocouple devices. In particular, conventional thermocouple devices and circuits may lose calibration over time while in operation. The loss in calibration is partially a result of diffusion that occurs between the two dissimilar thermoelectric elements that were physically connected to each other at the "hot junction" of the thermocouple circuit. This loss in calibration is referred to herein as thermoelectric drift and contributes to increasing inaccuracy of a thermocouple device. As described above, the proximal ends of the thermoelectric elements of the present example are coupled to a substrate at coupling points spaced a distance "D" apart such that the proximal ends of the thermoelectric elements of the present example are not physically coupled to one another. Nevertheless, diffusion between the substrate and the individual thermoelectric elements may still lead to thermoelectric drift. Consider, for example, a platinum/rhodium alloy vessel such as might be used in a glass making process for holding/processing a molten glass. Such vessels may operate in excess of 1500° C. Conventionally, individual platinum-rhodium alloy thermocouple wires, each having a different rhodium content, have been welded directly to the vessel wall. At such high operating temperatures, diffusion of rhodium between the substrate and the thermocouple wires was relatively rapid, as diffusion of rhodium across the junction between the wires and the vessel wall worked to reach an equilibrium concentration. The result was a continuously decreasing temperature as measured by the measuring device.

The tab elements can reduce or even eliminate the diffusion that can occur between the two dissimilar thermoelectric materials and therefore reduce thermoelectric drift (e.g. voltage or temperature drift) that can occur over time to substantially no drift. In one example, a thermocouple circuit can exhibit a rate of drift less than approximately 2.5° C. over a 30 day period at a temperature equal to or greater than about 1500° C. Still further, the thermocouple circuit can exhibit a rate of drift that is less than about 2.0° C., 1.5° C., 1.0° C., or even less than about 0.5° C. over a 30 day period at a temperature equal to or greater than about 1500° C. Still further, it should also be understood that the distance of separation "D," between the first and second coupling positions, can be any desired distance so long as any two dissimilar thermoelectric materials are not physically coupled to one another at a coupling position of the substrate material.

It should also be understood that the "hot junction" formed by an example thermocouple circuit is formed by the coupling of the first and second thermoelectric elements with the electrically conductive substrate, preferably through first and second tab elements 203, 205, and not by the physical junction of the two dissimilar thermoelectric elements themselves. As such, the resulting thermocouple circuit is more sensitive to changes in temperatures within the substrate itself. Further, the reported temperature will also be more representative of the substrate temperature as the substrate is part of the actual hot junction of the circuit.

It should also be understood that the separation of the thermoelectric elements results in the determination of an average temperature of the substrate between the two dissimilar thermoelectric elements coupled at the first and second coupling points 305 and 309. Therefore, in an alternative example, the thermocouple apparatus can be used to provide a plurality of thermocouple circuits capable of determining a three dimensional temperature model for a given substrate in real time.

Figure 7:
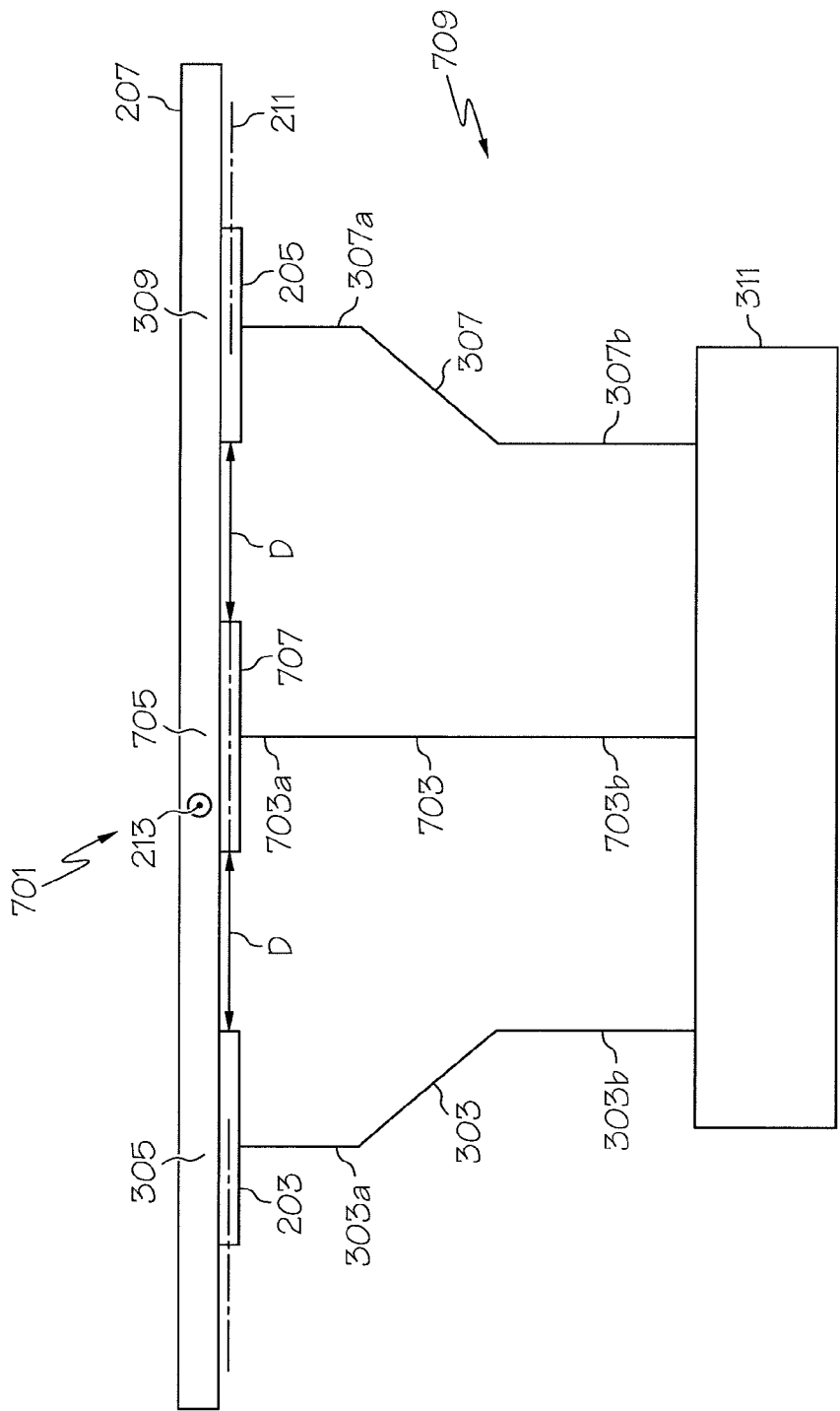
FIG. 7 is another thermocouple circuit according to an embodiment of the present invention.

Referring now to FIG. 7, an apparatus 701 is shown similar to apparatus 301. The apparatus 701 includes an example thermocouple 709 configured to be coupled to the electrically conductive substrate 207. The thermocouple 709 includes a third thermoelectric element 703 formed of a third thermoelectric material and having a third proximal end 703a and a third distal end 703b. The third distal end 703b can again be coupled to a suitable measuring device. The third proximal end 703a can be coupled to the substrate at a third coupling point 705 spaced apart from the first and second coupling points 305, 309 such that the third proximal end 703a is not coupled to either of the first and second proximal ends 303a, 307a. Still further, the third thermoelectric element may also include a third tab element 707, coupled to the third proximal end 703a. The third tab element 707 can again be formed from the same thermoelectric material as the third thermoelectric element and spaced apart a distance D from both the first and second tab elements 203, 205 so that the first, second and third tab elements are not physically coupled to each other. The distance between the first tab element 203 and the third tab element 707 may be equal to, greater than, or less than the distance between the second tab element 205 and the third tab element 707.

In use, the thermocouple apparatus described above and, hence thermocouple circuits of the present examples provide a method for determining a temperature of a portion of an electrically conductive substrate. The method comprises forming a thermocouple circuit as described above. In particular, a proximal end of a first thermoelectric element, formed of a first thermoelectric material, is coupled to a conductive substrate at a first coupling position, preferably through a first tab element. A proximal end of a second thermoelectric element, formed of a second thermoelectric material, is coupled to the conductive substrate at a second coupling position, preferably through a second tab element spaced apart from the first coupling position such that the first and second thermoelectric elements, and their respective tab elements, are not physically coupled. In one example, a third proximal end of a third thermoelectric element may be included, formed of a third thermoelectric material and coupled to the conductive substrate at a third coupling position, preferably through a third tab element spaced apart from the first and/or second positions such that the first, second, and third thermoelectric elements, and their respective tab elements, are not physically coupled.

It should be understood that the method of the present example is not limited for use with any particular substrate material and may be used to determine the temperature of any desired electrically conductive substrate. However, in one example, the substrate is an electrically conductive substrate, such as, for example, a platinum and/or rhodium based delivery apparatus used in the preparation of glass (e.g. silica-based glass).

Once formed, the thermocouple circuit is then capable of providing a voltage within the formed circuit, resulting from the temperature gradient along the thermoelectric elements. The provided voltage can be quantified by a conventional measuring device in communication with the thermocouple circuit. Accordingly, the quantified voltage is indicative of an average temperature within the portion of the substrate between the first and second coupling positions.

A conventional voltage detection apparatus, such as a measurement device 311, can be used to detect and quantify the net voltage $V_{12}$ established in the thermocouple circuit between first and second distal ends 303b, 307b. To this end, the detection apparatus can detect the voltages $V_1$ and $V_2$, determine the net voltage, and correlate the net voltage to an estimated temperature of the electrically conductive substrate 207. Since the two dissimilar tab elements are separated a distance "D," the estimated temperature represents an average temperature of the substrate between the first and second coupling points 305, 309. An example detection apparatus can generally comprise computer monitoring apparatus equipped with a standard I/O card for thermocouples. The detection apparatus can read the DC voltage between the two legs or leads of the thermocouple. Using standard ASTM test methods known to one of ordinary skill in the art, the computer can then convert the signal to a temperature output.

The electrically conductive substrate 207 may be directly heated in a number of ways. For example, the electrically conductive substrate 207 may be heated by conduction heaters, convection heaters, radiating heaters, or other heating configurations. In the present example, the electrically conductive substrate 207 may be attached to one or more heating devices comprising resistance heating configurations. The resistance heating configurations can be designed to heat portions of the electrically conductive substrate 207 by flowing an electric current, such as an alternating current, through portions of the electrically conductive substrate 207. Therefore, the electrically conductive substrate can be heated by applying an electrical current flow through the electrically conductive substrate 207 along direction 213.

Apparatus of the present application can comprise applications where a thermocouple is used to measure temperatures in any electrically conductive substrate such as, for example, the platinum delivery apparatus used in the manufacture of glass substrates.

It will be apparent to those skilled in the art that various modifications and variations can be made without departing from the spirit and scope of the claimed invention.

The invention claimed is:

1. A method for determining a temperature of a portion of an electrically conductive substrate, comprising:
providing a thermocouple comprising a first thermoelectric element formed of a first thermoelectric material and having a first proximal end and a first distal end, and a second thermoelectric element formed of a second thermoelectric material and having a second proximal end and a second distal end;
forming a thermocouple circuit by coupling the respective proximal ends of the first and second thermoelectric elements to a portion of the electrically conductive substrate through intermediate first and second tab elements, respectively, the first and second tab elements having a composition substantially the same as the first and second thermoelectric materials, respectively, and wherein the first and second tab elements are spaced apart such that the first and second proximal ends are not physically coupled each to the other;
heating the electrically conductive substrate by applying an electrical current flow through the electrically conductive substrate, wherein the first tab element and the second tab element are spaced apart from one another along an axis transverse to a direction of the current flow, wherein the axis extends through the first tab element and the second tab element; and
quantifying a voltage provided by the formed thermocouple circuit, wherein said voltage is indicative of a temperature within the portion of the electrically conductive substrate.

2. The method according to claim 1, wherein the transverse axis is substantially perpendicular to the direction of the current flow.

3. The method according to claim 1, wherein the position of the first tab element and the second tab element along the axis transverse to the direction of the current flow reduces excess EMF noise.

4. The method according to claim 1 wherein the first and second thermoelectric materials are selected from the noble metals or noble metal alloys.

5. The method according to claim 1, wherein the electrically conductive substrate comprises platinum.

6. The method according to claim 1 wherein the thermocouple is a Type B thermocouple.

7. The method according to claim 1 wherein the thermocouple is a Type S thermocouple.

8. The method according to claim 1, wherein the quantified voltage is indicative of an average temperature within the portion of the electrically conductive substrate between the first and second proximal ends.

9. The method according to claim 1, wherein the electrically conductive substrate, the first and second thermoelectric elements and the first and second tab elements comprise a platinum-rhodium alloy.

10. The method of claim 1, wherein the step of heating includes operating a direct heating apparatus to apply the electrical current flow along the current flow direction through the electrically conductive substrate.

11. The method according to claim 1, wherein an insulating material is disposed between each of the first and second tab elements and the portion of the electrically conductive substrate.

12. The method according to claim 10, further including the step of:
reducing diffusion of a chemical species between the electrically conductive substrate and each of the first and second tab elements by coupling the portion of the electrically conductive substrate to the first and second tab elements only at a periphery of the first and second tab elements.

13. An apparatus comprising:
an electrically conductive substrate;
a direct heating apparatus configured to heat the substrate with an electrical current flow through the substrate;
a first thermoelectric element formed of a first thermoelectric material and having a first proximal end and a first distal end, wherein the first proximal end is coupled to the electrically conductive substrate through an intermediate first tab element formed of the first thermoelectric material at a first coupling position; and
a second thermoelectric element formed of a second thermoelectric material and having a second proximal end and a second distal end, wherein the second proximal end is coupled to the electrically conductive substrate through an intermediate second tab element formed of the second thermoelectric material at a second coupling position, and wherein the first and second coupling positions are not physically coupled together and are spaced apart from one another along an axis transverse to a direction of the current flow, wherein the axis extends through the first coupling position and the second coupling position; and a voltage measuring device electrically coupled to the first and second distal ends.

14. The apparatus according to claim 13, wherein the transverse axis is substantially perpendicular to the direction of the current flow.

15. The apparatus according to claim 13, wherein the orientation of the first and second coupling positions transverse to the direction of the current flow reduces excess EMF noise.

16. The apparatus according to claim 13, wherein the first and second thermoelectric materials are selected from the noble metals or noble metal alloys.

17. The apparatus according to claim 13, wherein the circuit exhibits a rate of thermocouple temperature drift less than approximately 2.5° C. over a 30 day period at a temperature equal to or greater than about 1500° C.

18. The apparatus according to claim 13, wherein the first tab element comprises a thickness $t_1$ and a volume $V_{t1}$, and wherein the first thermoelectric element is a first wire having a longitudinal axis, and wherein $V_{t1}$ is substantially greater than a volume $V_w$ of a portion of the first wire having a length L equal to $t_1$ and disposed adjacent to the first tab element.

19. The apparatus according to claim 18, wherein $V_{t1}$ is at least twice as great as $V_w$.

20. The apparatus according to claim 13, wherein an insulating material is disposed between each of the first and second tab elements and the electrically conductive substrate.

21. The apparatus according to claim 20, wherein the first tab element is coupled to the electrically conductive substrate only at a periphery of the first tab element with the insulating material disposed between the first tab element and the electrically conductive substrate, further wherein the second tab element is coupled to the electrically conductive substrate only at a periphery of the second tab element with the insulating material disposed between the second tab element and the electrically conductive substrate.

* * * * *